(12) United States Patent
Samaniego et al.

(10) Patent No.: US 7,864,101 B2
(45) Date of Patent: Jan. 4, 2011

(54) RADAR TRACKING SYSTEM

(75) Inventors: Raymond Samaniego, Plano, TX (US); Jagannath Rath, Plano, TX (US); Brandeis E. Marquette, Allen, TX (US)

(73) Assignee: Raytheon Company, Waltham, MA (US)

( * ) Notice: Subject to any disclaimer, the term of this patent is extended or adjusted under 35 U.S.C. 154(b) by 226 days.

(21) Appl. No.: 12/181,145

(22) Filed: Jul. 28, 2008

(65) Prior Publication Data

US 2010/0019956 A1 Jan. 28, 2010

(51) Int. Cl.
*G01S 13/00* (2006.01)
*G01S 7/40* (2006.01)

(52) U.S. Cl. ............ 342/95; 342/25 R; 342/94; 342/173; 342/174

(58) Field of Classification Search ......... 342/25 R, 342/25 A, 25 B, 25 C, 25 D, 25 E, 25 F, 89–97, 342/165, 173, 174
See application file for complete search history.

(56) References Cited

U.S. PATENT DOCUMENTS

| | | | | |
|---|---|---|---|---|
| 4,338,602 A * | 7/1982 | Roeder et al. | ............ | 342/62 |
| 4,562,439 A * | 12/1985 | Peralta et al. | ............ | 342/81 |
| 5,107,269 A * | 4/1992 | Labozzetta | ............ | 342/77 |
| 5,281,972 A * | 1/1994 | Jain | ............ | 342/25 F |
| 5,313,210 A * | 5/1994 | Gail | ............ | 342/25 A |
| 6,079,666 A * | 6/2000 | Hornback | ............ | 244/3.19 |
| 6,337,654 B1 * | 1/2002 | Richardson et al. | ............ | 342/90 |
| 6,914,553 B1 * | 7/2005 | Beadle et al. | ............ | 342/25 R |
| 7,053,815 B1 * | 5/2006 | Joynson et al. | ............ | 342/62 |
| 7,075,478 B2 * | 7/2006 | Hager et al. | ............ | 342/120 |
| 7,218,273 B1 * | 5/2007 | Webster et al. | ............ | 342/174 |
| 7,259,716 B1 * | 8/2007 | Dubbert et al. | ............ | 342/194 |
| 7,437,077 B2 * | 10/2008 | Wirth et al. | ............ | 398/119 |
| 2004/0090360 A1 * | 5/2004 | Vincent | ............ | 342/25 |

OTHER PUBLICATIONS

Notification of Transmittal of the International Search Report and the Written Opinion of the International Searching Authority (EP), or the Declaration; for PCT/US2009/051195 (13 pages), Sep. 30, 2009.
Ulaby, Fawwaz T.; "Radar Remote Sensing and Surface; vol. II; Scattering and Emission Theory," Artech House, Inc.; Norwood, MA, pp. 682-685, 1986.

* cited by examiner

*Primary Examiner*—Thomas H Tarcza
*Assistant Examiner*—Peter M Bythrow
(74) *Attorney, Agent, or Firm*—Baker Botts, L.L.P.

(57) ABSTRACT

According to one embodiment, a radar tracking system includes a radar coupled to a radar processing system. Radar processing system receives images from the radar and that are each obtained at a differing angular orientation of the radar to a target. Radar processing system dithers each image along its azimuthal extent and then combines the dithered images to form an enhanced image of the target.

19 Claims, 3 Drawing Sheets

RADAR TRACKING SYSTEM

GOVERNMENT RIGHTS

This invention was made with Government support under N00019-05-D-0003, Delivery Order 0004, Title: APS-137 ASuW Targeting, government agency NAVAIR. The Government has certain rights in this invention.

TECHNICAL FIELD OF THE DISCLOSURE

This disclosure generally relates to radars, and more particularly, to an radar tracking system and a method of using the same.

BACKGROUND OF THE DISCLOSURE

Radars detect objects by transmitting pulses of electromagnetic energy and receiving electro-magnetic energy reflected from the object. Some radars may be operated in a synthetic aperture radar (SAR) mode. The synthetic aperture radar (SAR) mode combines reflected pulses at differing locations to form an image of a region or one or more targets of interest. The pulses may be combined by separating information in each image according to its frequency and range components. Some radars may also be operated in an inverse synthetic aperture radar (ISAR) mode in which the radar receives multiple pulses by rotating a radar transceiver relative to the one or more targets.

SUMMARY OF THE DISCLOSURE

According to one embodiment, a radar tracking system includes a radar coupled to a radar processing system. Radar processing system receives images from the radar and that are each obtained at a differing angular orientation of the radar to a target. Radar processing system dithers each image along its azimuthal extent and then combines the dithered images to form an enhanced image of the target.

Some embodiments of the disclosure may provide numerous technical advantages. For example, one embodiment of the inverse synthetic aperture radar processing system may provide relatively good imagery using single-channel receiver radars. Single-channel receiver radars acquire image information from a single source, and therefore are not able to rely on spatial separation or other differential acquisition modes for canceling noise or other measurement errors. The radar processing system dithers each image received from radar to compensate for aperture errors along the azimuthal extent of the arc. Thus, multiple images may be combined into an enhanced image having a quality comparable to multi-channel receive radars operating in the inverse synthetic aperture radar mode.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Radars operating in the inverse synthetic aperture radar (ISAR) mode may provide numerous useful benefits. For example, the inverse synthetic aperture radar mode may provide imagery in situations, such as fog, where normal visibility may be limited. Known radars generate imagery by combining multiple received radar pulses to derive information about targets of interest. To generate a desired level of detail, these radars typically use multi-channel receivers in which each channel is separated from one another using differing operating frequencies or by physical separation. Extraneous information may be canceled from the derived imagery by differentially combining images from each channel of the multi-channel radar.

Use of single-channel radars operating in the inverse synthetic aperture radar mode to produce images having adequate resolution is generally difficult. Reasons for the generally inadequate level of resolution may include variances in the single-channel radar transceiver as it is scanned across a target over a period of time. For example, the direction of the electro-magnetic beam received by the radar typically encounters inaccuracies that may limit the resolution of the image.

Figure 1:
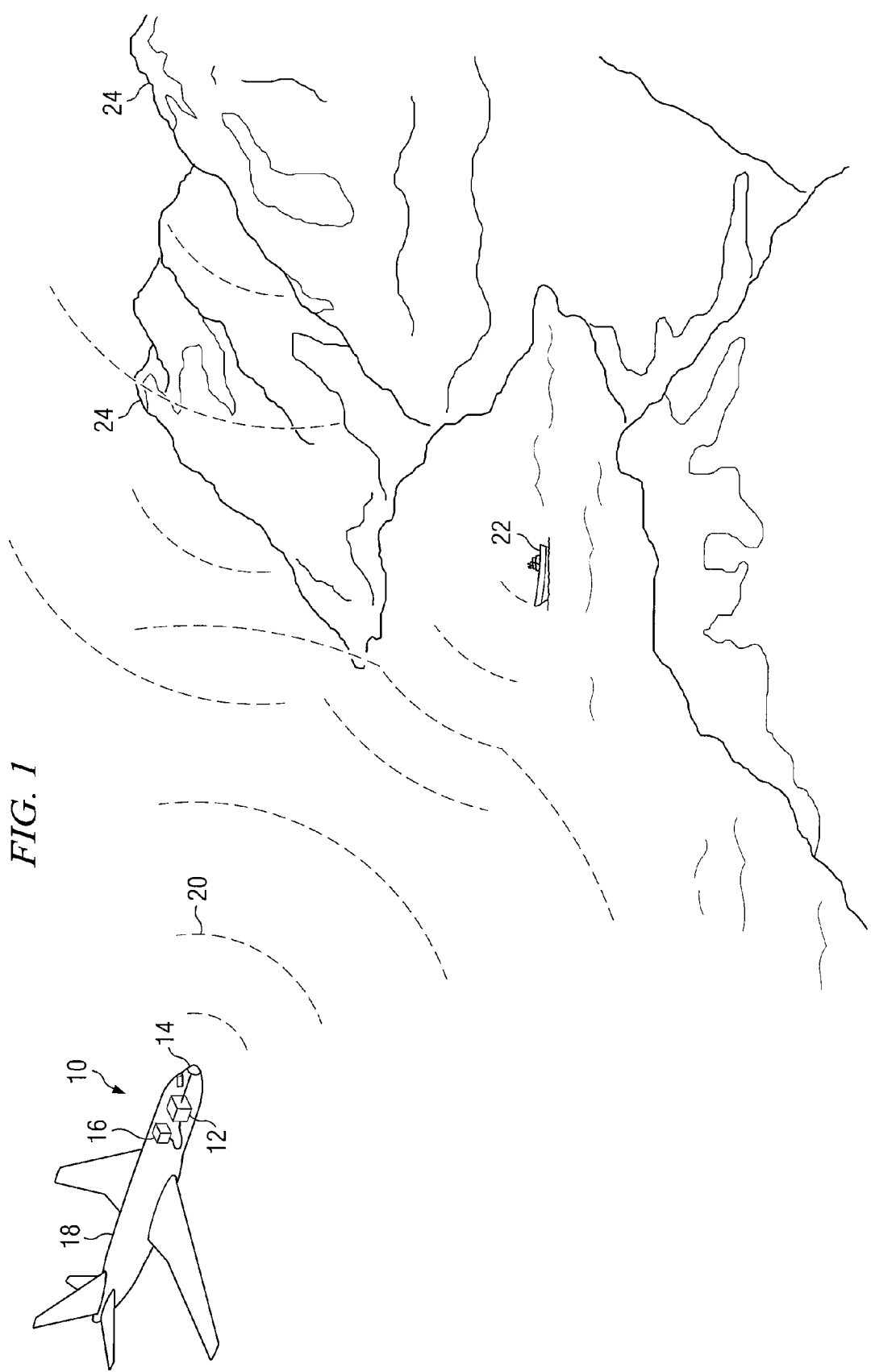
FIG. 1 shows one embodiment of a radar tracking system according to the teachings of the present disclosure.

FIG. 1 shows one embodiment of a radar tracking system 10 that may provide a solution to this problem and other problems. Radar tracking system 10 includes an radar processing system 12 coupled to a radar 14 and a navigation system 16. Navigation system 16 is configured on an aircraft 18. Radar 14 generates electro-magnetic energy 20 that may be reflected by a target 22 and one or more terrain features 24, which in this case are mountains. Radar processing system 12 receives pulses from radar 14 and combines these pulses to form images of target 22 and terrain features 24. These images may include amplitude and range information associated with target 22 and terrain features 24. According to the teachings of the present disclosure, images may be dithered along their azimuthal extent and subsequently combined to form an enhanced image of target 22.

Combining dithered images of target 22 may provide images having enhanced resolution over known single-channel receiver radars in some embodiments. Dithering generally refers to the controlled introduction of noise into the received images. In one embodiment, the frequency of dithering along the azimuthal extent of images may be maintained sufficiently low to not unduly degrade the quality of the resulting combined image.

In one embodiment, radar processing system 12 correlates measured locations of terrain features 24 with known locations of these terrain features 24 derived from navigation system 16 to determine a boresight correction factor for the radar 14. The derived boresight correction factor may be used to correct the static pointing error of radar 14 and thus, reduce a azimuth error in the determined location of target 22.

Certain embodiments that use known locations of terrain features 24 that may be present in received images to generate a boresight correction factor may provide enhanced accuracy of the target's location. Many single-channel receiver radars operating in the inverse synthetic aperture radar mode of operation suffer due to the lack of differential angular noise cancellation. Due to this reason, multi-channel receiver radars are used rather than single-channel receiver radars.

Multi-channel receiver radars, however, are relatively more expensive than their single-channel receiver radar counterparts. Radar processing system 12 correlates known locations of terrain features 24 with their measured locations derived in the received images to reduce aberrations caused by angular orientation errors characteristic of single-channel receiver radars.

In the particular embodiment shown, radar tracking system 10 is configured on an aircraft 18 having an onboard navigation system 16. In other embodiments, radar tracking system 10 may be configured on any suitable platform, such as a portable or fixed ground-based platform that identifies specific terrain features 24 around a target 22 of interest. Radar processing system 12 may correlate these known terrain features 24 with terrain features 24 obtained from the background image portion of images to generate a boresight correction factor for radar 14.

Figure 2:
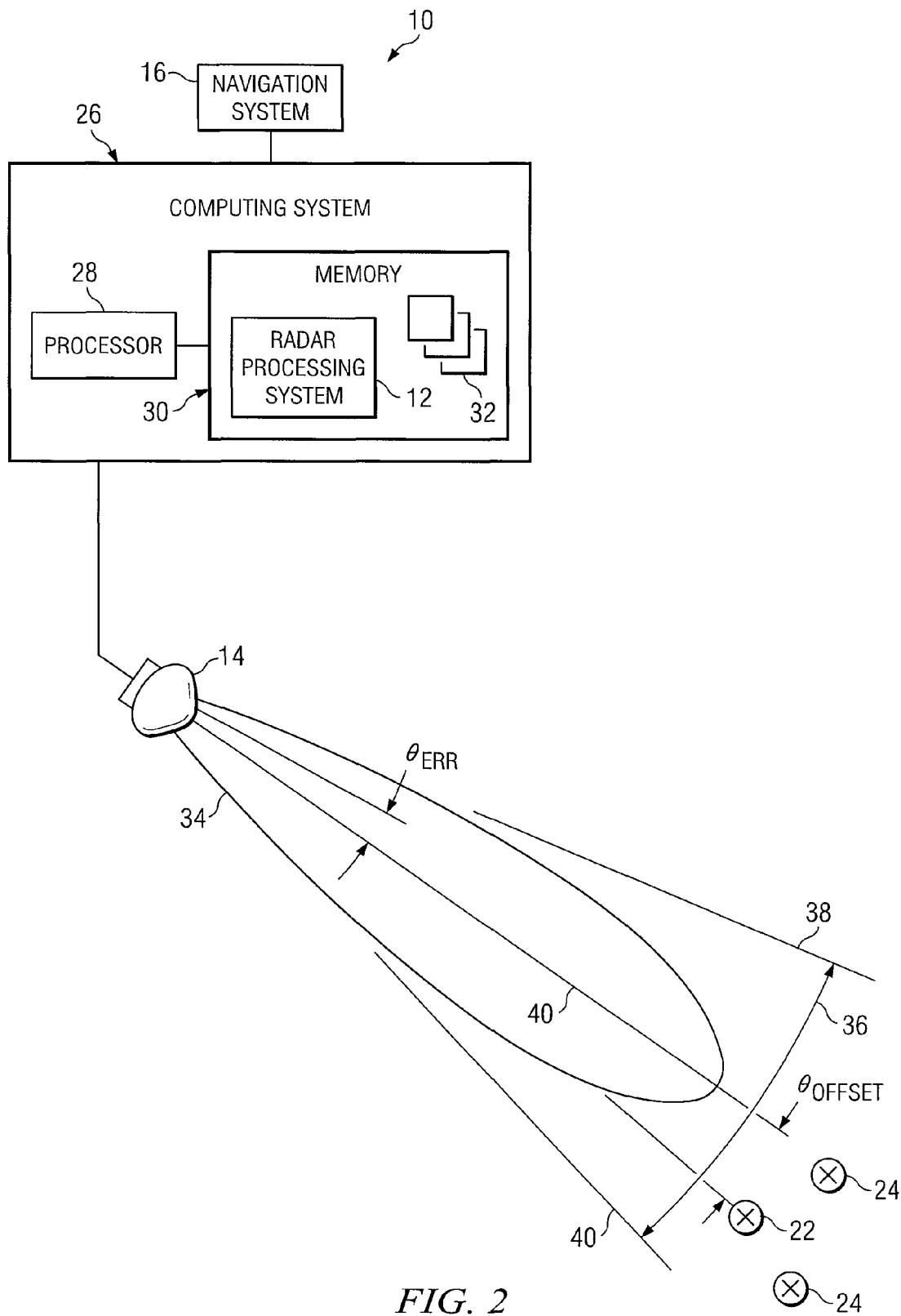
FIG. 2 is a block diagram showing various elements of the radar tracking system of FIG. 1.

FIG. 2 is a block diagram showing various elements of radar tracking system 10 of FIG. 1. Radar processing system 12 may be executed on a suitable computing system 28 having a processor 26 that executes instructions stored in a memory 30. Memory 30 stores records 32 that include information indicative of various terrain features 24 that may be detectable by radar 14. For example, records 32 may include information of a particular mountain range that is within the vicinity of a frequently flown reconnaissance route. Radar processing system 12 correlates the location and heading of aircraft 18 obtained from onboard navigation system 16 with stored information in records 32 to determine the location of terrain features 24, such as the one or more mountains. Received images including these terrain features 24 may be combined with these known locations to determine a boresight correction factor for radar 14.

In operation, radar processing system 12 receives location information from onboard navigation system 16 and obtains terrain features 24 particular to the received location information. Using these known terrain feature locations, measured terrain feature locations present in the receive images may be used to provide a boresight correction factor for radar 14. Onboard navigation system 16 may include any one or more devices that provide the location and heading of aircraft 18, which may be, for example, a global positioning system (GPS), a compass, and/or a VHF omni-directional radio range (VOR) device.

Radar 14 may be any suitable type of radar that can be scanned through an arc for operation in an inverse synthetic aperture radar mode of operation. Radar 14 includes a scanning mechanism that scans a received beam 34 through an arc 36 across a target 22 of interest. Arc 36 has an arc length that refers to the angular extent from a first orientation 38 to a second orientation 40. In one embodiment, radar 14 is physically scanned using a motor drive device that rotates the radar 14 through arc 36. Received beam 34 has a boresight axis 40 that generally designates a direction of the central lobe of received beam 34.

$\theta_{offset}$ represents an angular orientation of the received beam 34 relative to the apparent angle of target 22. Due to inaccuracies of the scanning mechanism of radar 14, $\theta_{offset}$ may encounter a deviation error $\theta_{error}$. Radar processing system 12 determines the boresight correction factor to compensate for deviation error $\theta_{error}$. In one embodiment, the boresight correction factor may be performed on a particular radar 14 in which radar processing system 12 uses an overlapped subaperture (OSA) processing technique. Using the overlapped subaperture processing technique, estimation of the deviation error $\theta_{error}$ may be performed in the various subapertures before cropping of images. In another embodiment, the boresight correction factor may be performed using a focused synthetic aperture radar (SAR) technique. Using the focused synthetic aperture radar technique, there are no subapertures. Estimation of the deviation error $\theta_{error}$ may be performed before the resulting image is cropped. An estimate of the clutter-to-noise ratio may be used along with predetermined threshold values to determine how much emphasis should be placed on a certain measurement. If the focused synthetic aperture radar technique is used over water, it may be desirable for the radar processing system 12 to reject the correction in which an amplitude threshold should handle this case.

When operated in the inverse synthetic aperture radar mode, radar processing system 12 controls radar 14 to repeatedly scan in a to-and-fro motion through an arc 36 to obtain multiple images at various angular orientations with respect to target 22. In one embodiment, radar processing system 12 controls the arc length according to a current estimate of an angular orientation of target 22. That is, the angular distance through which received beam 34 travels is based upon a current estimate of the location of target 22.

In one embodiment, the angular orientation of target 22 may be determined using a geometric centroid of received pulses in each image. In many cases, target 22 may have multiple structural elements that are spatially separated from each other, such as a seagoing vessel that has several masts. Reflected pulses from each of these structural elements may, therefore, be separately received by radar 14. By calculating a mean value of the reflected electro-magnetic energy rather than the peak return value, a relatively more accurate estimate of the angular orientation of targets having multiple structural elements may be achieved in some embodiments. The geometric centroid (az_centroid) may be calculated according to the formula:

$$\text{az\_centroid} = \frac{\sum a_t \cdot az_{ant}}{\sum a_t}$$

where:
  $a_t$ is the target amplitude given by the median value given in 2; and
  $az_{ant}$ is the antenna azimuth angle given by the encoder, corresponding to the target amplitude.

In some cases, measurement error may be introduced due to various atmospheric abberations, such as thermal inversions, precipitation, or other airborne debris dispersed in the atmosphere. Thus in one embodiment, radar processing system 12 determines a tropospheric correction factor for the received electro-magnetic energy received by radar 14. One embodiment of a formula for providing a tropospheric correction factor (tropo_cor(m)) is:

$$\text{tropo\_cor}(m) = \text{TROPO\_BIAS} + \text{TROPO\_SCALE\_FACTOR} \cdot \left(\frac{r_b}{1000}\right)\sqrt{\frac{\text{surf\_ref}}{(h/304.8)}}$$

where:
  $r_b$ is the slant range;
  h is the radar height above the target;
  surf_ref is the surface refractivity; and
  TROPO_BIAS and TROPO_SCALE_FACTOR are coefficients that are derived empirically.

The slant range represents the actual distance to target 22 prior to any adjustment factors that are used for mapping target 22 to a suitable coordinate system, such as an East North up (ENU) or an Earth centered Earth fixed (ECEF) coordinate system. The TROPO_BIAS and TROPO_S-CALE_FACTOR coefficients represent a "worldwide average" over various regions of the Earth. Further enhancements may be obtained by using coefficients that vary with location.

In one embodiment, radar processing system 12 implements a calibration range correction factor to calibrate range measurements provided by radar 14. The calibration range correction factor may be determined using surveyed point targets having a distance from radar 14 which is known. Radar tracking system 10 measures and records range measurements for each of these surveyed point targets. The measured values may then be compared with known values of their ranges to compute the calibration range correction factor for radar tracking system 10.

Radar processing system 12 combines images using any suitable manner. In one embodiment, radar processing system 12 uses an extended kalman filter to combine images received from radar 14. The kalman filter inputs measured values for range, doppler, and bearing of target 22 to estimate its position and velocity. There is therefore, a non-linear relationship between the estimated state of target 22 and its measurements. Acceleration of slow moving targets, such as seagoing vessels are relatively benign; therefore, its acceleration is not estimated, rather accounted for using the state noise covariance matrix Q. A general form of a kalman filter may be expressed by a state transition matrix and a state vector:

$$\Phi(t_{i+1}, t_i) = \Phi(t_i + T, t_i): \text{State Transition Matrix} = \begin{pmatrix} 1 & T & 0 & 0 \\ 0 & 1 & 0 & 0 \\ 0 & 0 & 1 & T \\ 0 & 0 & 0 & 1 \end{pmatrix}$$

$X_i$: State Vector $= [\, E_i \;\; \dot{E}_i \;\; N_i \;\; \dot{N}_i \,]$

Where:
T is the update interval between filter cycles;
the subscript i refers to the filter cycle index;
($E_i, N_i$) are the East and North positions of the target, respectively;
($\dot{E}_i, \dot{N}_i$) are the velocity components of the target, respectively.

Following acquisition of each image, the kalman filter computes a new estimate of the position and velocity of target 22. Each new state may be computed according to:

$$K_i = P_i^- H_i^{T*}(H_i P_i^- H_i^T + R)^{-1}$$

$$X_i^+ = X_i^- + K_i^*(\text{measured\_observation} - \text{predicted\_observation})$$

Where:
$X^-$ is the state vector prior to image incorporation;
$X^+$ is the state vector following incorporation of image;
H is a geometry matrix that may include partial derivatives of images with respect to one another;
P is the state covariance matrix;
K is the kalman gain matrix;
R is the measurement covariance matrix; and
Q is the state noise matrix.

The covariance matrix may be updated as follows:

$$P_i^+ = (I - K_i H_i) P_i^- (I - K_i H_i)^T + K_i R K_i^T$$

The state transition matrix and covariance matrix may be augmented with each new measurement according to:

$$X_{i+1}^- = \Phi(t_{i+1}, t_i) X_i^+; \; t_{i+1} = t_i + T$$

$$X_{i+1}^- = X^-(t_{i+1}) \text{ etc}$$

$$P_{i+1}^- = \Phi(t_{i+1}, t_i) P_i^+ \Phi(t_{i+1}, t_i)^T + Q(t_{i+1}, t_i)$$

where $$Q(t_{i+1}, t_i) + Q(t_i + T, t_i) = T\sigma_a^2 \begin{pmatrix} T^2/3 & T/2 & 0 & 0 \\ T/2 & 1 & 0 & 0 \\ 0 & 0 & T^2/3 & T/2 \\ 0 & 0 & T/2 & 1 \end{pmatrix}$$

In the above equation, $\sigma_a$, characterizes acceleration noise standard deviation. In this implementation, we incorporate one measurement at a time. Thus, there is no matrix inversion involved in the computation.

The kalman filter may also include an observation matrix or geometry matrix for mapping measured values of the range, position, and velocity components of target 22 to a suitable coordinate system. A rectangular Cartesian coordinate system, such as a local level or East North up (ENU) coordinate system may be used to reference the position and velocity of target 22. The origin of this coordinate system, described by latitude, longitude and altitude ($\lambda_0, \phi_0, 0$) in a geodetic coordinate system is arbitrary but may be placed in the vicinity of target 22. A particular target, such as a seagoing vessel that is typically bound to the surface of the Earth, may be described in terms of its East and North position components on the local level plane. The position and the velocity of radar 14, which may be provided by navigation system 16 configured on aircraft 18, is usually given in terms of its latitude, longitude and altitude for the position and the velocity is specified by its East, North, and up components. In one embodiment, the estimated range and position values of target 22 may be mapped to an East North up coordinate system according to the following equations:

$$\rho = \text{Ground Range} = [(E_T - E_A)^2 + (N_T - N_A)^2]^{1/2}$$

$$\vec{R}_T = (E_T, N_T, 0): \text{Target Position vector}$$

$$\vec{V}_T = (\dot{E}_T, \dot{N}_T, 0): \text{Target velocity vector}$$

$$\vec{R}_A = (E_A, N_A, U_A): \text{Aircraft position vector}$$

$$\vec{V}_A = (\dot{E}_A, \dot{N}_A, \dot{U}_A): \text{Aircraft velocity vector}$$

$$H = \begin{bmatrix} \dfrac{\partial \rho}{\partial E_T} & \dfrac{\partial \rho}{\partial \dot{E}_T} & \dfrac{\partial \rho}{\partial N_T} & \dfrac{\partial \rho}{\partial \dot{N}_T} \end{bmatrix} = [\, l_x \;\; 0 \;\; l_y \;\; 0 \,]$$

$$l_x = \frac{(E_T - E_A)}{\rho}, \; l_y = \frac{(N_T - N_A)}{\rho}$$

The estimated velocity value of target 22 may be mapped to the East North up coordinate system according to the following equations:

$$D = \frac{2(\vec{V}_T - \vec{V}_A) \cdot (\vec{R}_T - \vec{R}_A)}{\lambda \rho_a}$$

$$\rho_a = [(E_T - E_A)^2 + (N_T - N_A)^2 + U_A^2]^{1/2}$$

-continued $$H = \begin{bmatrix} \frac{\partial D}{\partial E_T} & \frac{\partial D}{\partial \dot{E}_T} & \frac{\partial D}{\partial N_T} & \frac{\partial D}{\partial \dot{N}_T} \end{bmatrix} = \begin{bmatrix} h_{11} & h_{12} & h_{13} & h_{14} \end{bmatrix}$$

$$h_{11} = \frac{2(\dot{E}_T - \dot{E}_A)}{\lambda \rho_a} - D \frac{l'_x}{\rho_a}; \quad h_{12} = \frac{2l'_x}{\lambda}$$

$$h_{13} = \frac{2(\dot{N}_T - \dot{N}_A)}{\lambda \rho_a} - D \frac{l'_y}{\rho_a}; \quad h_{14} = \frac{2l'_y}{\lambda}$$

where $$l'_x = \frac{(E_T - E_A)}{\rho_a}, \quad l'_y = \frac{(N_T - N_A)}{\rho_a}$$

The estimated bearing value of target 22 may be mapped to the East North up coordinate system according to the following equations:

$$Az = \arctan\left[\frac{(\text{LGV\_E}_T - \text{LGV\_E}_A)}{(\text{LGV\_N}_T - \text{LGV\_N}_A)}\right]$$

$$H = \begin{bmatrix} \frac{\partial Az}{\partial E_T} & \frac{\partial Az}{\partial \dot{E}_T} & \frac{\partial Az}{\partial N_T} & \frac{\partial Az}{\partial \dot{N}_T} \end{bmatrix} = \begin{bmatrix} h_{11} & 0 & h_{13} \end{bmatrix}$$

$$h_{11} = \frac{1}{\left[1 + \frac{(E_T - E_A)^2}{(N_T - N_A)^2}\right]} \frac{1}{(N_T - N_A)}$$

$$= \frac{(\text{LGV\_N}_T - \text{LGV\_N}_A)}{[(\text{LGV\_N}_T - \text{LGV\_N}_A)^2 + (\text{LGV\_E}_T - \text{LGV\_E}_A)^2]}$$

$$h_{13} = -\frac{\frac{(E_T - E_A)}{(N_T - N_A)}}{\left[1 + \frac{(E_T - E_A)^2}{(N_T - N_A)^2}\right]} \frac{1}{(N_T - N_A)}$$

$$= \frac{(\text{LGV\_E}_T - \text{LGV\_E}_A)}{[(\text{LGV\_N}_T - \text{LGV\_N}_A)^2 + (\text{LGV\_E}_T - \text{LGV\_E}_A)^2]}$$

Modifications, additions, or omissions may be made to radar tracking system 10 without departing from the scope of the invention. The components of radar tracking system 10 may be integrated or separated. For example, navigation system 16 may be integrated into the radar processing system 12. Moreover, the operations of radar tracking system 10 may be performed by more, fewer, or other components. For example, the previously described embodiment uses a radar that is physically scanned using a mechanical drive mechanism. Other embodiments may use an active electronically scanned array (AESA) having multiple radiating elements that may be independently excited to scan the received beam 34 through arc 36.

Figure 3:
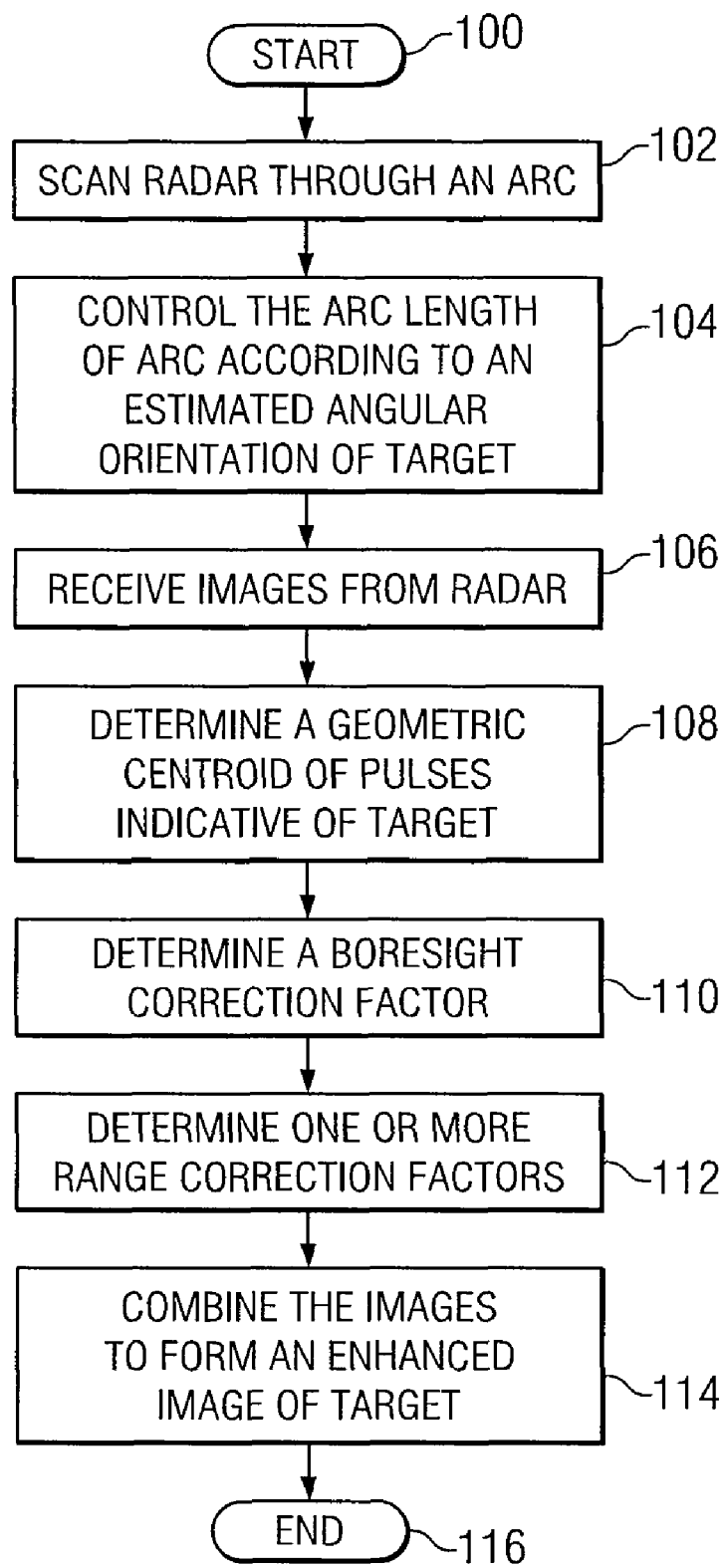
FIG. 3 is a flowchart showing one embodiment of a series of actions that may be performed to operate the radar tracking system of FIG. 1.

FIG. 3 is a flowchart showing one embodiment of a series of actions that may be performed to operate the radar tracking system 10. In act 100, the process is initiated.

In act 102, radar processing system 12 scans radar 14 through an arc 36. In one embodiment, radar 14 is a single-channel receiver radar. In another embodiment, radar 14 includes a motor drive mechanism for physically scanning its received beam through the arc 36. The radar 14 may be scanned such that target 22 is maintained within the angular length of arc 36.

In act 104, radar processing system 12 controls the arc length of scanned arc 36 according to an estimated orientation of the target 22. The kalman filter generates an estimate of the direction of target 22 that may vary with time. For targets that are stationary or have a relatively slow or fixed velocity, the estimate may improve with acquisition of each image. The estimate, however, may get worse as target 22 moves, turns, or changes velocity. Thus, radar processing system 12 may vary the arc length through which the radar 14 is scanned according to the estimated direction of target 22.

In act 106, radar processing system 12 receives images from radar 14. Each image may include a plurality of pulses indicative of a target and one or more terrain features 24. Images are acquired while radar 14 is scanned. Thus, each image has an angular orientation relative to target 22 that differs from one another. Each image received by radar processing system 12 is dithered along its azimuthal extent.

In act 108, radar processing system 12 determines a direction of target 22 by generating a geometric centroid according to received pulses indicative of target 22. In some embodiments, determining the direction of target 22 using a geometric centroid rather than by a peak amplitude of pulses may provide enhanced accuracy due to particular targets having several structural elements that are physically separated from one another.

In act 110, radar processing system 12 determines a boresight correction factor for radar 14 and adjusts the angular orientation of the images relative to the target 22 according to the boresight correction factor. In a particular embodiment in which radar tracking system 10 is configured on an aircraft 18, radar processing system 12 determines the boresight correction factor according to one or more terrain features 24 in the background portion of the images. These terrain features 24 are correlated with known locations of each of the one or more terrain features to determine the boresight correction factor.

In act 112, radar processing system 12 determines one or more range correction factors for radar 14 and adjusts the measured range values of the target 22 and one or more terrain features according to the range correction factors. In one embodiment, radar processing system 12 generates a tropospheric range correction factor to counteract various abberations and/or climatic variations in the atmosphere, such as temperature, precipitation, humidity, and the like. In another embodiment, radar processing system 12 generates a calibration range correction factor in which measured range values are compared with known range values for one or more terrain features 24.

In act 114, radar processing system 12 combines the plurality of images to form an enhanced image of target 22. The combined images may also provide enhanced velocity and heading information of target 22. In one embodiment, radar processing system 12 uses a kalman filter in which each ensuing image augments a matrix for computing the direction and heading of target 22. In another embodiment, the kalman filter may also be used to map the direction and heading of target 22 between differing coordinate systems.

Each of the previously described actions may be repeatedly performed during operation of radar tracking system 10. That is, each of acts 104 through 114 may be performed following acquisition of each image from radar 14. When operation of radar tracking system 10 is no longer needed or desired, the process ends in act 116.

Modifications, additions, or omissions may be made to the method without departing from the scope of the disclosure. The method may include more, fewer, or other acts. For example, radar processing system 12 may use any one or more of the previously described correction factors to enhance the accuracy of images derived by radar tracking system 10. Use of the previously described correction factors may provide relatively good imagery using single-channel radars that are physically scanned in an inverse synthetic aperture radar mode in some embodiments.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A radar tracking system comprising:
   a radar comprising a single-channel receiver that receives a beam of reflected electro-magnetic energy; and
   a radar processing system coupled to the radar and operable to:
   physically scan the radar, using a motor drive device coupled to the radar, through an arc having an angular length;
   select the angular length of the arc according an estimated location of the target;
   receive a plurality of radar images from the radar, each of the plurality of images obtained at one of a plurality of angular orientations of a boresight direction of the beam relative to a target, the target having a target location that is within the angular length of the arc;
   determine a boresight correction factor of the beam according to a terrain feature location of a terrain feature in each of the plurality of radar images and a known terrain feature location of the terrain feature, the known terrain feature location determined according to a radar location and information associated with the terrain feature, the information received from one or more records stored in a memory;
   adjust the one angular orientation of each of the plurality of images according to the boresight correction factor;
   adjust a range measurement of the target from the radar according to a tropospheric range correction factor and a calibration range correction factor;
   dither each of the plurality of radar images along an azimuthal extent of the each image; and
   combine the plurality of dithered radar images, using a kalman filter, to generate an enhanced image of the target.

2. A radar tracking system comprising:
   a radar that receives a beam of reflected electro-magnetic energy; and
   a radar processing system coupled to the radar and operable to:
   scan the radar through an arc having an angular length;
   receive a plurality of radar images from the radar, each of the plurality of images obtained at one of a plurality of angular orientations of a boresight direction of the beam relative to a target, the target having a target location that is within the angular length of the arc;
   dither each of the plurality of radar images along an azimuthal extent of the each image;
   combine the plurality of dithered radar images to generate an enhanced image of the target; and
   wherein the radar processing system is operable to determine a boresight correction factor of the beam according to an imaged terrain feature location of a terrain feature and a known terrain feature location of the terrain feature, and adjust the one angular orientation of each of the plurality of images according to the boresight correction factor.

3. The radar tracking system of claim 2, wherein the radar comprises a single-channel receiver.

4. The radar tracking system of claim 2, wherein the radar processing system is further operable to select the angular length of the arc according an estimated location of the target.

5. The radar tracking system of claim 2, wherein the radar processing system is operable to adjust a range measurement of the target from the radar according to a tropospheric correction factor.

6. The radar tracking system of claim 2, wherein each of the plurality of images comprises a plurality of pulses representing electro-magnetic energy reflected from the target, the radar processing system operable to determine a geometric centroid of the plurality of pulses and estimate the target location according to the determined geometric centroid.

7. The radar tracking system of claim 2, wherein the radar processing system is operable to combine the plurality of radar images using a kalman filter.

8. The radar tracking system of claim 2, wherein the radar processing system is operable to physically scan the radar through the arc using a motor drive device.

9. The radar tracking system of claim 2, wherein the radar processing system is operable to receive a radar location of the radar from a navigation system, receive one or more records including information associated with the terrain feature, and determine the known terrain feature location according to the radar location and the information associated with the terrain feature.

10. The radar tracking system of claim 2, wherein the radar processing system is operable to determine a calibration range correction factor for the radar by comparing a measured range of the terrain feature with a known range of the terrain feature, and adjust the measured range according to the determined range correction factor.

11. A radar tracking method comprising:
    scanning a radar through an arc having an angular length, the radar receiving a beam of reflected electro-magnetic energy;
    selecting the angular length of the arc according to an estimated location of the target;
    modifying the selected angular length of the arc according to a subsequent estimated location of the target;
    receiving a plurality of radar images from the radar, each of the plurality of images obtained at one of a plurality of angular orientations of a boresight direction of the beam relative to a target, the target having a target location that is within the angular length of the arc;
    dithering each of the plurality of radar images along an azimuthal extent of the each image; and
    combining the plurality of radar images to generate an enhanced image of the target.

12. The radar tracking method of claim 11, wherein scanning the radar through the arc comprises scanning the radar comprising a single-channel receiver through the arc.

13. The radar tracking method of claim 11, further comprising determining a boresight correction factor of the beam according to a terrain feature location of a terrain feature in each of the plurality of radar images and a known terrain feature location of the terrain feature, and adjusting the one angular orientation of each of the plurality of images according to the boresight correction factor.

14. The radar tracking method of claim 11, further comprising adjusting a range measurement of the target from the radar according to a tropospheric correction factor.

15. The radar tracking method of claim 11, further comprising determining a geometric centroid of a plurality of pulses that represent electro-magnetic energy reflected from the target, and estimating the target location according to the determined geometric centroid.

16. The radar tracking method of claim 11, wherein combining the plurality of radar images comprises combining the plurality of radar images using a kalman filter.

17. The radar tracking method of claim 11, wherein scanning the radar through the arc comprises physically scanning the radar through the arc using a motor drive device.

18. The radar tracking method of claim 13, further comprising receiving a radar location of the radar from a navigation system, receiving one or more records including information associated with the terrain feature, and determining the known terrain feature location according to the radar location and the information associated with the terrain feature.

19. The radar tracking method of claim 13, further comprising determining a calibration range correction factor for the radar by comparing a measured range of the terrain feature with a known range of the terrain feature, and adjusting the measured range according to the determined range correction factor.

* * * * *